United States Patent [19]

Storey et al.

[11] Patent Number: 5,075,379

[45] Date of Patent: Dec. 24, 1991

[54] RUBBER/DIAMINE BLENDS FOR USE IN CURING EPOXY RESINS

[75] Inventors: Robson F. Storey, Hattiesburg, Miss.; Sudhakar Dantiki, Toledo, Ohio; J. Patrick Adams, Hattiesburg, Miss.

[73] Assignees: First Chemical Corporation, Pascagoula; The University of Southern Mississippi, Hattiesburg, both of Miss.

[21] Appl. No.: 581,134

[22] Filed: Sep. 10, 1990

Related U.S. Application Data

[63] Continuation of Ser. No. 313,854, Feb. 23, 1989, abandoned.

[51] Int. Cl.⁵ .......................... C08F 8/00; C08L 63/00
[52] U.S. Cl. ..................................... 525/113; 528/120
[58] Field of Search .......................... 525/113; 528/120

[56] References Cited

U.S. PATENT DOCUMENTS 4,593,056  6/1986  Qureshi et al. ...................... 525/113

Primary Examiner—John Kight, III
Assistant Examiner—Frederick Krass
Attorney, Agent, or Firm—Breiner & Breiner

[57] ABSTRACT

The use of a blend of diaminoisopropylbenzene (DAIPB) and an amine terminated butadiene nitrile liquid rubber (ATBN) for curing epoxy resins is provided. The DAIPB/ATBN blend produces a rubber toughened epoxy resin having improved tensile properties.

2 Claims, No Drawings

RUBBER/DIAMINE BLENDS FOR USE IN CURING EPOXY RESINS

FIELD OF INVENTION

This invention is related to the use of a rubber/diamine blend as a curing agent for epoxy resins. More particularly, diaminoisopropylbenzene (DAIPB) modified with an amine terminated butadiene nitrile liquid rubber (ATBN) is used as a curing agent in the production of epoxy resins.

BACKGROUND OF INVENTION

Various curing agents are known in the art for use in epoxy resin systems, such as aliphatic polyamines, polyamides, amido-amines, cycloaliphatic amines, certain anhydrides, phenol-formaldehyde, urea-formaldehyde, melamine-formaldehyde and aromatic amines.

Aromatic diamines have been in use for many years as curing agents for epoxy resins. They were originally introduced to increase the glass transition temperature (Tg) of the cured resins in order to impart increased dimensional stability at elevated temperatures In addition, aromatic diamines have been found to provide long pot lives. The cured epoxy resins produced using aromatic diamines have good physical properties and good resistance to solvents and chemicals.

The aromatic diamines most widely used for curing epoxy resins are m-phenylene diamine (MPD), methylene dianiline (MDA) and diaminodiphenylsulfone (DADS). Recently, however, MDA and MPD have come under an increasing attack due to their high toxicity. In fact, MDA has been found to produce cancer in laboratory rats. Accordingly, a need has arisen for new aromatic diamines which can serve as replacements for MDA without causing detrimental effects in the epoxy resins produced.

It has now been found that DAIPB blended with ATBN is a good curing agent for producing a rubber toughened epoxy resin having good tensile properties. The tensile strength achieved through the use of the DAIPB/ATBN blends is better than that achieved when using DAIPB alone.

OBJECT AND GENERAL DESCRIPTION OF INVENTION

It is a primary object of the present invention to provide DAIPB modified with ATBN for use as a curing agent for producing epoxy resins having improved tensile properties.

The object of the present invention is accomplished by providing blends of DAIBP with at least 0.5 weight percent and up to about 10 weight percent of ATBN and utilizing the blends to cure epoxy resins. Preferably, the amount of ATBN will be from about 2 to 5 weight percent. The blends of DAIPB and ATBN provide increased tensile properties in the cured epoxy resins as compared to the tensile properties provided when DAIPB is utilized alone. By using the DAIPB/ATBN blends as curing agents, rubber-modified epoxy resins are produced.

The DAIPB/ATBN blends of this invention are suitable for curing any of the epoxy resin systems as known and practiced by one skilled in the art.

The diamine, DAIPB, has the following structural formula:

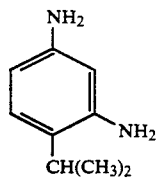

ATBN is a synthetic liquid rubber made by copolymerizing acrylonitrile and butadiene with a suitable free radical initiator to yield a liquid reactive polymer containing terminal carboxylic acid functional groups. The carboxylic acid functional groups are converted to reactive secondary amine groups using appropriate postpolymerization chemical reactions. Any commercially available ATBN is suitable for use in the present invention. The ATBN utilized in the embodiments set forth below is marketed under the trade name HYCAR X-16 by B. F. Goodrich.

Suitable epoxy resins for use in accordance with the present invention include the diglycidyl ether of bisphenol-A (DGEBA) marketed, for example, under the trade name DER 332 by Dow Chemical Company and having the structural formula:

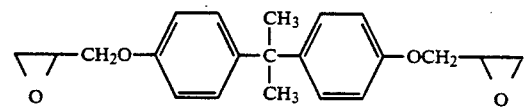

and an equivalent weight of 172.1.

Additional epoxy resins suitable for use with the invention are the commercially available polyepoxy compounds, particularly the diepoxy compounds, as are obtained through reaction of polynuclear phenols, particularly bisphenol A or phenol novolaks and epichlorohydrin. Optionally other epoxy resins, for example those based on polyols, can be used. Products of the latter type are known to one skilled in the art and are described in the literature. Specific examples of suitable resins include mononuclear aromatic glycidyl and glycidyl ether resins; polynuclear aromatic glycidyl ether epoxy resins; aromatic glycidyl epoxy resins; triazine based glycidyl and glycidyl ether epoxy reins; fluorinated glycidyl ether epoxy resins; cyano glycidyl ether epoxy resins; and glycidyl amine and glycidyl sulfonamide epoxy resins.

PRESENTLY PREFERRED EMBODIMENTS

The following examples illustrate the invention without limiting its scope.

(1) Procedure utilized in Examples 1–5

The epoxy resin DGEBA was heated using a circulating air oven set at a temperature of 85° C. Excess amounts of the individual components DAIPB and ATBN were heated just to melting in a sealed container.

In Examples 2–5, appropriate amounts of the liquified diamine and the liquified ATBN were blended to provide for a substitution of the ATBN in a small percentage to the DAIPB. In Example 1, only DAIPB was utilized for comparison purposes. The amounts utilized are determined on the basis of weight percent (wt.%) with the combination present in the blend being equal to 100 weight percent. The ATBN is preferably blended with the DAIPB in an amount of at least 0.5 wt.% and up to about 10 wt.% and is most preferably present in an amount of about 2-5 wt.%. Accordingly, the DAIPB will be present in a complementary amount to ATBN to equal 100 wt.%.

Following the preparation of the liquified DAIPB and/or ATBN, a stoichiometric equivalent amount of the epoxy resin is added thereto. The components are mixed thoroughly. The mixture is evacuated at 60° C. for 15 minutes to remove air bubbles. The reaction mixture is then poured into a glass mold heated to 85° C. The mold was prepared in advance by lightly spraying the inner surfaces of the mold with a mold release agent. It was determined that the prepared mold should be baked for at least two hours in advance of curing to obtain the proper conditioning of the glass surfaces. Samples were cured for two hours at 85° C. followed by two hours at 150° C. Following curing, the samples were removed from the mold and machined to ASTM D638 specifications and stored in a desiccator until ready to be used.

The tensile properties were determined according to ASTM D638 using an Instron tensile tester equipped with a 500 kg load cell.

Glass transition temperatures (Tg's) were determined using a DuPont DSC 910 attached to a 9900 data analysis system. All samples were scanned under nitrogen atmosphere at a rate of 10° C./min.

Densities of the cured resins were obtained by accurately weighing rectangular solids which were precision machined from expended tensile specimens. Approximate dimensions of the specimens were 1 cm.×1 cm.×0.32 cm. Accurate dimensional measurements were obtained using a micrometer.

(2) Procedure utilized in Example 6.

Example 6 is a comparison example utilizing MPD to cure the epoxy resin DGEBA. The same procedure as described above for Examples 1-5 was utilized with the exception that 100 wt.% of MPD was mixed with DGEBA rather than the DAIPB or DAIPB/ATBN mixture.

(3) Results of Examples 1-6.

Properties of the cured rubber-modified resins are set forth in Table I below.

TABLE I

| Mechanical Properties of Rubber-Modified Epoxy Resins | | | | |
|---|---|---|---|---|
| Example No. | DAIPB/ATBN (wt/wt) | Tg °C. | Tensile Property | | |
| | | | T.S. psi, $\times 10^{-3}$ | Elongation % | Modulus psi, $\times 10^{-5}$ |
| 1 | 100/0 | 167 | 7.8 | 3.4 | 3.0 |
| 2 | 99/01 | 162 | 8.9 | 4.0 | 2.7 |
| 3 | 98/02 | 156 | 7.2 | 3.4 | 3.0 |
| 4 | 97/03 | 153 | 10.6 | 7.1 | 2.6 |
| 5 | 95/05 | 148 | 9.0 | 6.2 | 2.1 |

TABLE I-continued

| Mechanical Properties of Rubber-Modified Epoxy Resins | | | | |
|---|---|---|---|---|
| Example No. | DAIPB/ATBN (wt/wt) | Tg °C. | T.S. psi, $\times 10^{-3}$ | Elongation % | Modulus psi, $\times 10^{-5}$ |
| 6 | MPD | 167 | 11.9 | 5.7 | 2.8 |

Very low levels of rubber incorporation were chosen to provide an increase in the strength of the epoxy resin without significantly affecting other resin properties, such as modulus and Tg. As shown in Table I, the Tg decreases steadily as the amount of rubber incorporation increases. Additionally, the Tg broadens and becomes less defined. These factors indicate the increasing heterogeneity of the resin The use of 1-2 wt.% of ATBN produces cured epoxy resins having higher tensile strengths than those resins cured using DAIPB alone. Use of ATBN in the range of from 3 wt.% to 5 wt.% provides the most increase in the tensile strength and elongation and accordingly, a decrease in the modulus. The tensile strength maximizes at between about 3-4 wt.% of ATBN.

In general, the density of the rubber-modified resins decreases as the amount of ATBN is increased as shown in Table II below.

TABLE II

| Densities of Rubber-Modified Expoxy Resins | | |
|---|---|---|
| Example No. | DAIPB/ATBN (wt/wt) | Density (g/cm³) |
| 1 | 100/00 | 1.13 |
| 2 | 99/01 | 1.16 |
| 3 | 98/02 | 1.15 |
| 4 | 97/03 | 1.14 |
| 5 | 95/05 | 1.12 |
| 6 | MPD | 1.16 |

The decrease in the density of the rubber-modified resins is due to the increasing hydrocarbon content of the cured resin and, presumably, to an increase in free volume associated with the flexible ATBN component.

As will be apparent to one skilled in the art, various modifications can be made within the scope of the aforesaid description. Such modifications being within the ability of one skilled in the art form a part of the present invention and are embraced by the appended claims.

It is claimed:

1. A method of using a blend of diaminoisopropylbenzene and an amine terminated butadiene nitrile liquid rubber in the production of cured epoxy resins comprising mixing a blend of diaminoisopropylbenzene and an amine terminated butadiene nitrile liquid rubber with an epoxy resin in the absence of a cure accelerator and subjecting said mixture to conditions sufficient to cure said epoxy resin, wherein said diaminoisopropylbenzene is present in an amount of from about 90 to 99.5 weight percent and said amine terminated butadiene nitrile liquid rubber is present in an amount of from about 0.5 to 10 weight percent.

2. A method according to claim 1 wherein said amine terminated butadiene nitrile liquid rubber is present in an amount of from about 2 to 5 weight percent.

* * * * *